United States Patent [19]
Naka et al.

[11] Patent Number: 5,294,209
[45] Date of Patent: Mar. 15, 1994

[54] TOOL ATTACHING DEVICE

[75] Inventors: Hirokazu Naka; Tadashi Hayasaka, both of Iwata, Japan

[73] Assignee: Yamaha Hatsudoki Kabushiki Kaisha, Shizuoka, Japan

[21] Appl. No.: 917,190

[22] Filed: Jul. 22, 1992

[30] Foreign Application Priority Data

| Jul. 25, 1991 | [JP] | Japan | 3-205615 |
| Jul. 25, 1991 | [JP] | Japan | 3-208616 |
| Jul. 25, 1991 | [JP] | Japan | 3-208617 |
| Jul. 25, 1991 | [JP] | Japan | 3-208618 |

[51] Int. Cl.$^5$ .................................. B25J 17/00
[52] U.S. Cl. ............................. 403/24; 403/328; 901/30
[58] Field of Search ................... 403/24, 321, 322, 325, 403/328; 414/729, 730, 744 A; 901/30, 49

[56] References Cited

U.S. PATENT DOCUMENTS

| 4,636,135 | 1/1987 | Bancon | 403/322 X |
| 4,793,053 | 12/1988 | Zuccaro et al. | 901/30 X |
| 4,836,048 | 6/1989 | Torii et al. | 74/608 |
| 4,944,629 | 7/1990 | Peveto | 901/30 X |
| 5,083,352 | 1/1992 | Nakako | 901/30 X |

FOREIGN PATENT DOCUMENTS

| 0274332 | 7/1988 | European Pat. Off. | 901/30 |
| 3310191A1 | 10/1984 | Fed. Rep. of Germany . | |

Primary Examiner—Randolph A. Reese
Assistant Examiner—Christopher J. Novosad
Attorney, Agent, or Firm—Bacon & Thomas

[57] ABSTRACT

An attaching device for attaching a tool to a tool manipulating arm is disclosed having a first attachment member affixed to the tool manipulating arm which is adapted to engage a second attachment member affixed to the tool. The first attachment member includes a locking device which is engageable with a cam surface formed on the second attachment member such that the engagement urges a seating surface defined on the first attachment member and a mounting surface defined on the second attachment member into sealing contact with each other. The seal effected by the contact of these surfaces hermetically seals the locking device such that it is not susceptible to contamination by the dust, water, sand, chips, oil, etc. which may be present in the working environment in which the robot is located.

21 Claims, 11 Drawing Sheets

TOOL ATTACHING DEVICE

BACKGROUND OF THE INVENTION

The present invention relates to a device for attaching a tool to a tool manipulating arm of an industrial robot or the like.

Industrial robots are known in the art and are typically utilized to perform mechanical tasks in working environments in which the robot may be subjected to dust, water, sand, chips, oil, etc. The sophistication of such industrial robots has increased in recent years and they are now able to perform a great number of complex tasks.

In order to more fully utilize the capabilities of such industrial robots, it is necessary to provide the manipulating arm with a variety of tools. The attachment of the tool to the manipulating arm (and the subsequent detachment of the tool) must be accomplished quickly and reliably in order to maximize the production efficiency of the industrial robot. It is also necessary for the attachment to include means for transferring electrical power from the manipulating arm to the tool and to provide the maximum protection of the attachment device from the working environment. Ideally, the attaching device should be provided with protection from dust, water, etc. which may be present in the working environment.

Known attaching devices connect the tool to the manipulating arm by inserting a pin, extending from the manipulating arm, into a hole formed on the tool. Although this device has a very simple structure, there is a slight gap between the hole and the pin which is required to allow the pin to slide into the hole. Such a clearance introduces a significant amount of play into the tool/manipulating arm connection, which is undesirable in many industrial situations. The gap also provides an entry point for foreign matter in the working environment to contaminate the attaching device, possibly rendering it ineffective.

SUMMARY OF THE INVENTION

An attaching device for attaching a tool to a tool manipulating arm is disclosed having a first attachment member affixed to the tool manipulating arm which is adapted to engage a second attachment member affixed to the tool. The first attachment member includes a locking device which is engageable with a cam surface formed on the second attachment member such that the engagement urges a seating surface defined on the first attachment member and a mounting surface defined on the second attachment member into sealing contact with each other. The seal effected by the contact of these surfaces hermetically seals the locking device such that it is not susceptible to contamination by the dust, water, sand, chips, oil, etc. which may be present in the working environment in which the robot is located.

In order to increase the reliability and rapidity of the attachment and detachment of the tool, a non-contact type electrical coupler may be associated with the first and second attachment members. This enables electrical power to be transferred from the manipulating arm to the tool without the necessity of providing interengaging electrical contacts which may also contaminated by the working environment.

The second attachment member defines a recessed portion which is entered by the locking device of the first attachment member. The locking device includes a plurality of pins which are movable in a generally radial direction between extended and retracted positions by a single cam member. The cam surface defined by the second attachment member faces inwardly of the recess and is positioned such that, when contacted by the locking pins, such contact draws the seating surface and mounting surface together into sealing contact. In this way, the manufacturing tolerances of the locking device do not effect the sealing contact between the seating and mounting surfaces. Such sealing contact between the seating and mounting surfaces also reduces the play in the connection between the tool and the end of the manipulating arm.

The cam member operating the locking pins is movably attached to an actuating piston so as to be capable of movement in directions extending generally perpendicular to the axis of movement of the piston. This accommodates for slight variations in the positions of the locking pins due to manufacturing tolerances, and ensures that the cam member will contact all of the locking pins and move them in their radial directions substantially simultaneously.

DETAILED DESCRIPTION OF THE PREFERRED EMBODIMENTS

Figure 1:
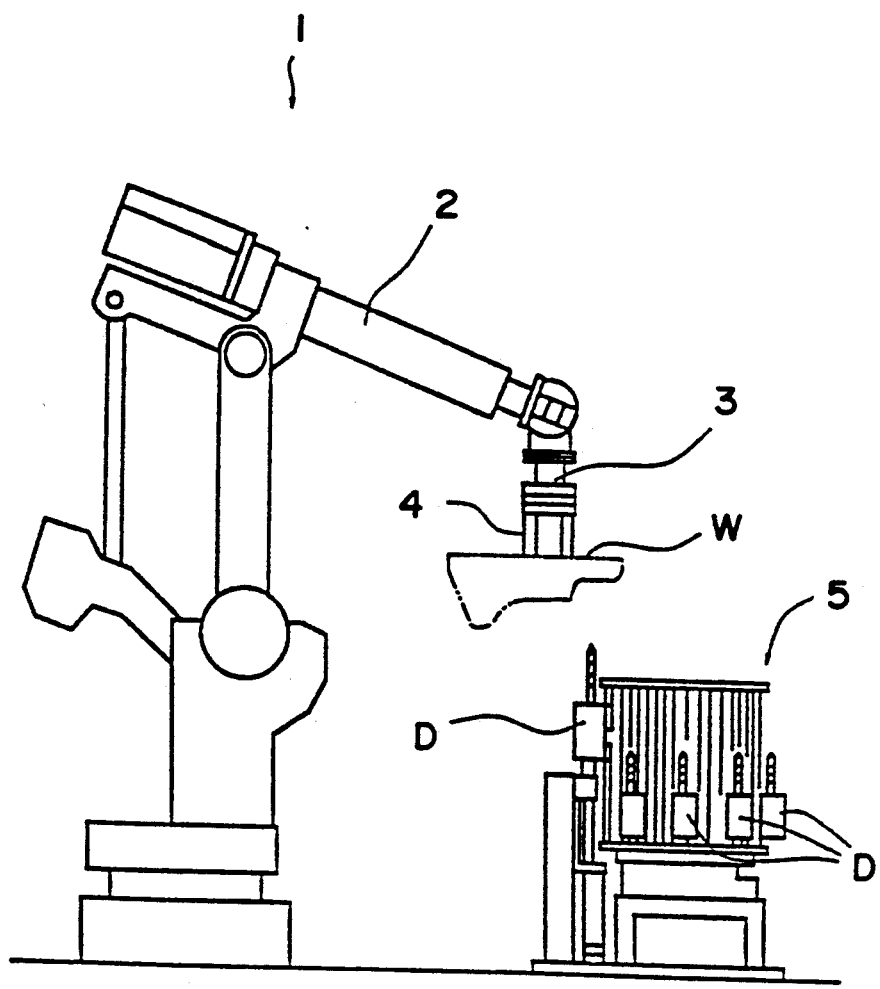
FIG. 1 is a side view of an industrial robot and a tool working station.

FIG. 1 illustrates an industrial vertical multi-joint robot 1 having a manipulating arm 2 provided with a tool attaching device 3. A tool 4 is attached to the tool attaching device 3 and, in this particular instance, tool 4 performs the pick and place work of the work W. Tool 4 grips the work W and the industrial robot manipulates the work to perform a drilling operation with drill D of drilling machine 5.

By placing various tools 4 to be used by the robot 1 on a tool stand, the robot 1 may utilize a series of tools in order to carry out a variety of desired functions. The tool attaching device 3 which attaches and detaches the tool to and from the end of the manipulating arm is the subject of this invention and is illustrated in FIGS. 2-8. The tool attaching device 3 of this invention may be constructed utilizing stainless steel, or ordinary steel for its various elements to minimize the damage to the attaching device caused by collision with surrounding structures as a result of teaching or program errors of the industrial robot, and to improve its corrosion resistance.

The attaching device 3 of this invention comprises a first attachment member 6 affixed to the end of the tool manipulating arm 2 and a second attachment member 7 affixed to the tool 4. The first and second attachment members have locking means to releasably lock them together so as to facilitate the attachment of the tool to the manipulating arm and the detachment of the tool from the manipulating arm.

The first attachment member 6 comprises a base plate 11, a cylinder member 12 affixed to the base plate 11, a holding member 13 mounted on the lower end of the cylinder member 12 and a locking device 14 extending from the holding member 13. The first attachment member 6 is attached to the end of the manipulating arm 2 by the base plate 11 via bolts, screws, or the like. Base plate 11 defines a first air passage 15 which extends from a first air supply port 19 and communicates with the cylinder 17 defined by the cylinder member 12.

Figure 2:
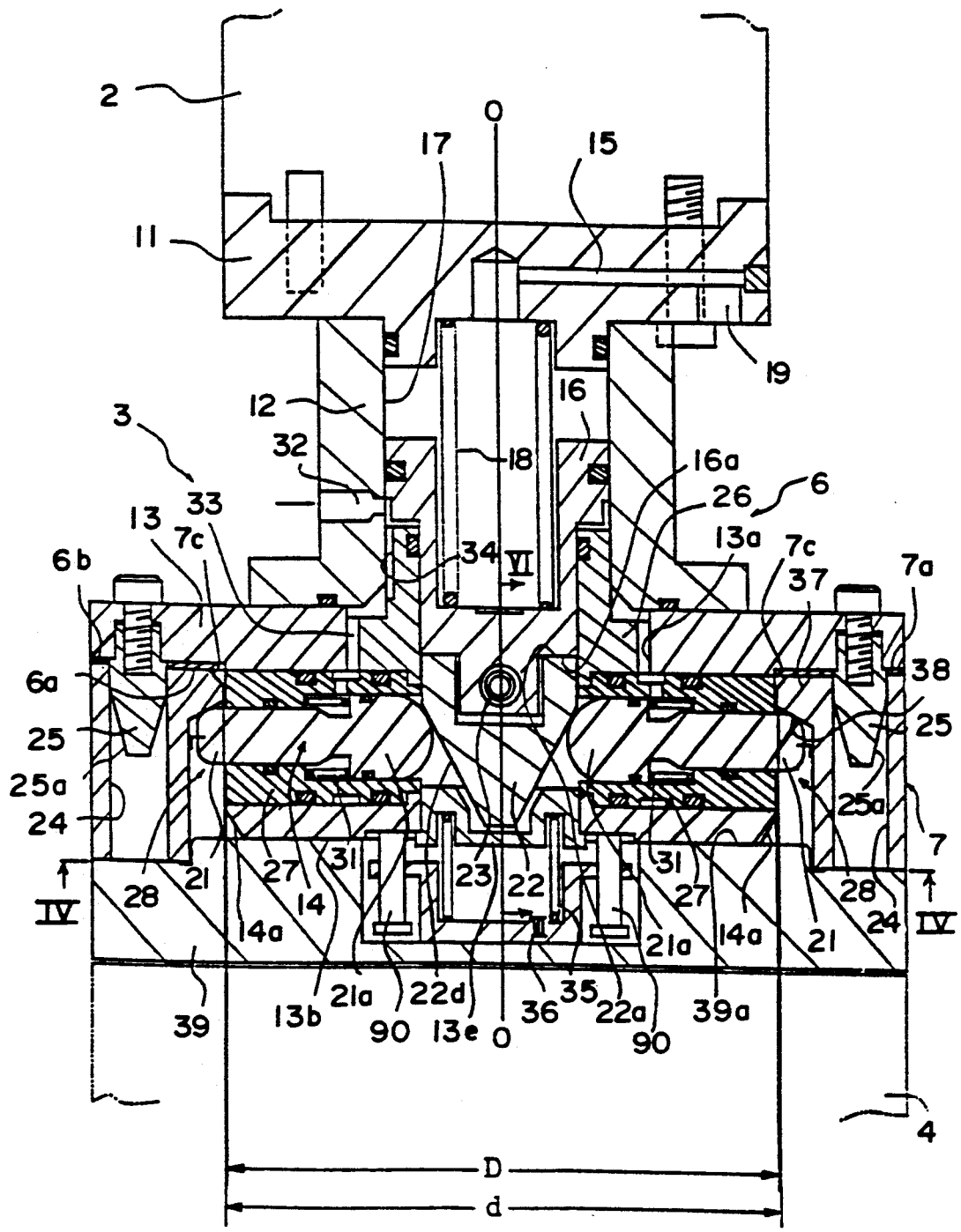
FIG. 2 is a cross-sectional view of the attaching device according to the present invention showing the locking pins in their extended positions.

Cylinder member 12 is mounted on a lower surface of base plate 11 and defines a cylinder 17 therein in which piston 16 is slidably mounted so as to move between a first, or uppermost position (see FIG. 3) and a second, or lowermost position along axis O, which is also the center line of the piston. Coil spring 18 interposed between the base plate 11 and the piston 16 urges the piston 16 toward its second, or lowermost position, which is illustrated in FIG. 2.

A generally conical cam member 22 is mounted on a lower end portion of the piston 16 via a resilient spring pin 23. Cam member 22 moves along axis O with the piston 16 and has a cam surface 22d with a generally conical configuration. As can be seen in FIG. 2, during the down stroke of piston 16, the lower end surface 16a pushes against upper end surface 22a of cam member 22 thereby transferring the driving force of the piston to the cam member 22. During the upward stroke of piston 16, cam member 22 receives an upward force from the piston 16 through its connection with the resilient spring pin 23.

Holding member 13 mounted on the lower end portion of cylinder member 12 defines a through hole 13a at its approximate center portion to enable the cam member 22 to pass through during its upward and downward movement.

First attachment member 6 defines a peripheral edge portion 6a which may constitute a seating surface on the holding member 13 which is pressed against a peripheral edge portion 7a defined by the second attachment member 7 and which may constitute a mounting surface. A rubber packing 6b may be attached to either the seating or mounting surface so as to be disposed between them when they are moved into contact with each other. One or more positioning pins 25 extend downwardly from the holding member 13 so as to be slidably engageable with one or more positioning openings 24 defined by the second attachment member 7. The lower surface of the holding member 13 has a seating surface 13b which, when the attachment members are engaged, bears against mounting surface 39a formed on an upper portion of the mounting plate 39 which is attached to the attachment member 7.

The rubber packing 6b between the seating surface 6a on the holding member 13 and the mounting surface 7a of the second attachment member 7 is elastically deformed when the mounting surface 39a on the mounting plate 39 is pushed against the seating surface 13b of the holding member 13. Alternatively, a gap may be provided between the lower surface of the holding member 13 and the upper surface of the mounting plate 39 which will allow the pushing of the mounting surface 7a of the second attachment member 7 against the seating surface 6a formed on the holding member 13.

The peripheral edge portion of the holding member 13 may constitute the seating surface 6a, while the peripheral edge portion of the second attachment member 7 may constitute the mounting surface 7a. Thus, when the lock pin 21 is pushed against the cam surface 38, the second attachment member 7 is urged toward the first attachment member 6 such that the mounting surface 7a is pressed against the seating surface 6a. Although the rubber packing 6b is illustrated in the figures, it is to be understood that this rubber packing need not always be inserted between the seating surface 6a and the mounting surface 7a and may be eliminated.

Figure 3:
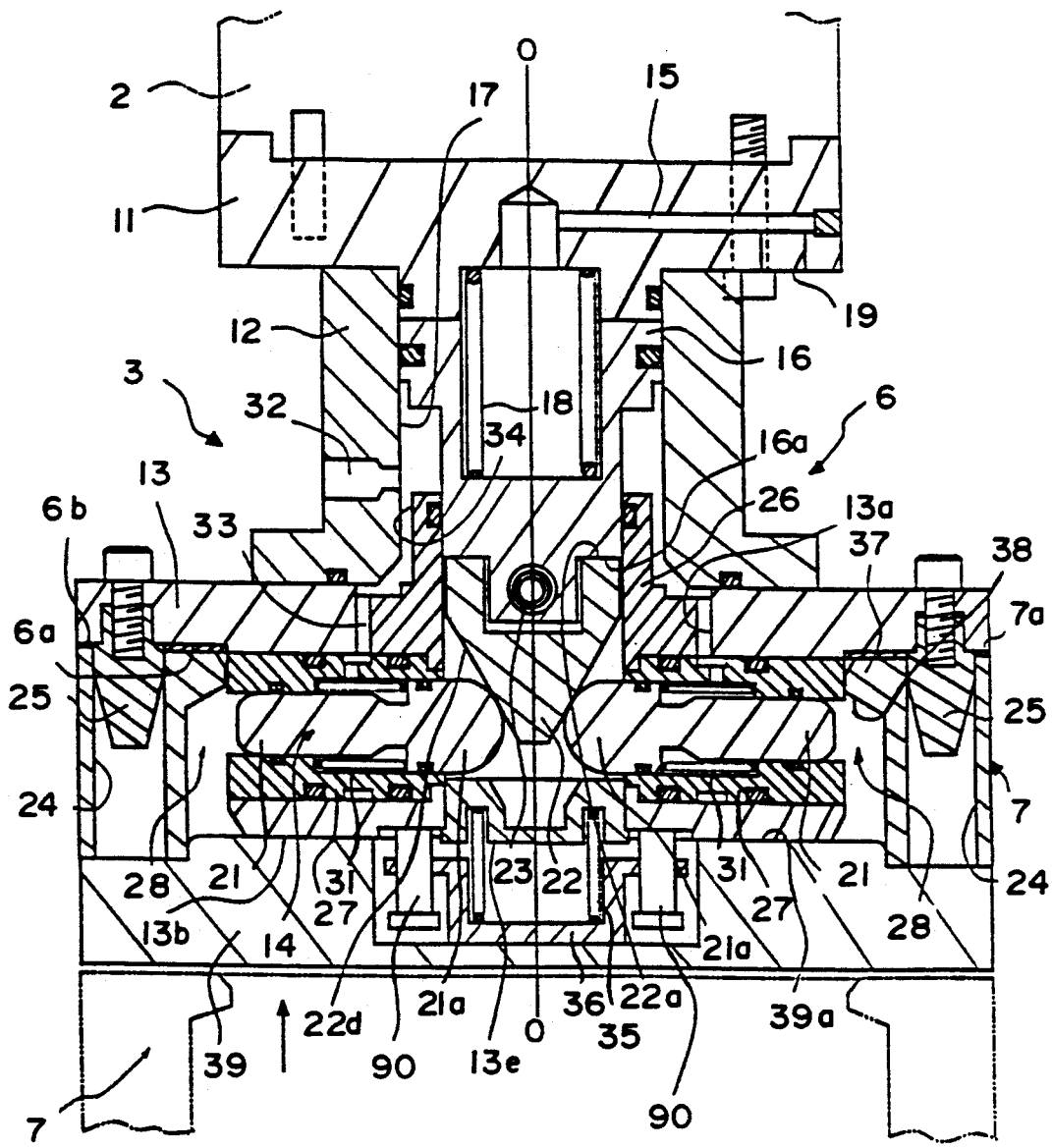
FIG. 3 is a cross-sectional view, similar to FIG. 2, showing the locking pins in their retracted positions.

As illustrated in FIGS. 2 and 3, a sleeve member 26 is inserted in the through hole 13a so as to slidably bear against the sides of the piston 16 to thereby improve the airtightness between the piston 16 and the cylinder 17.

Figure 4:
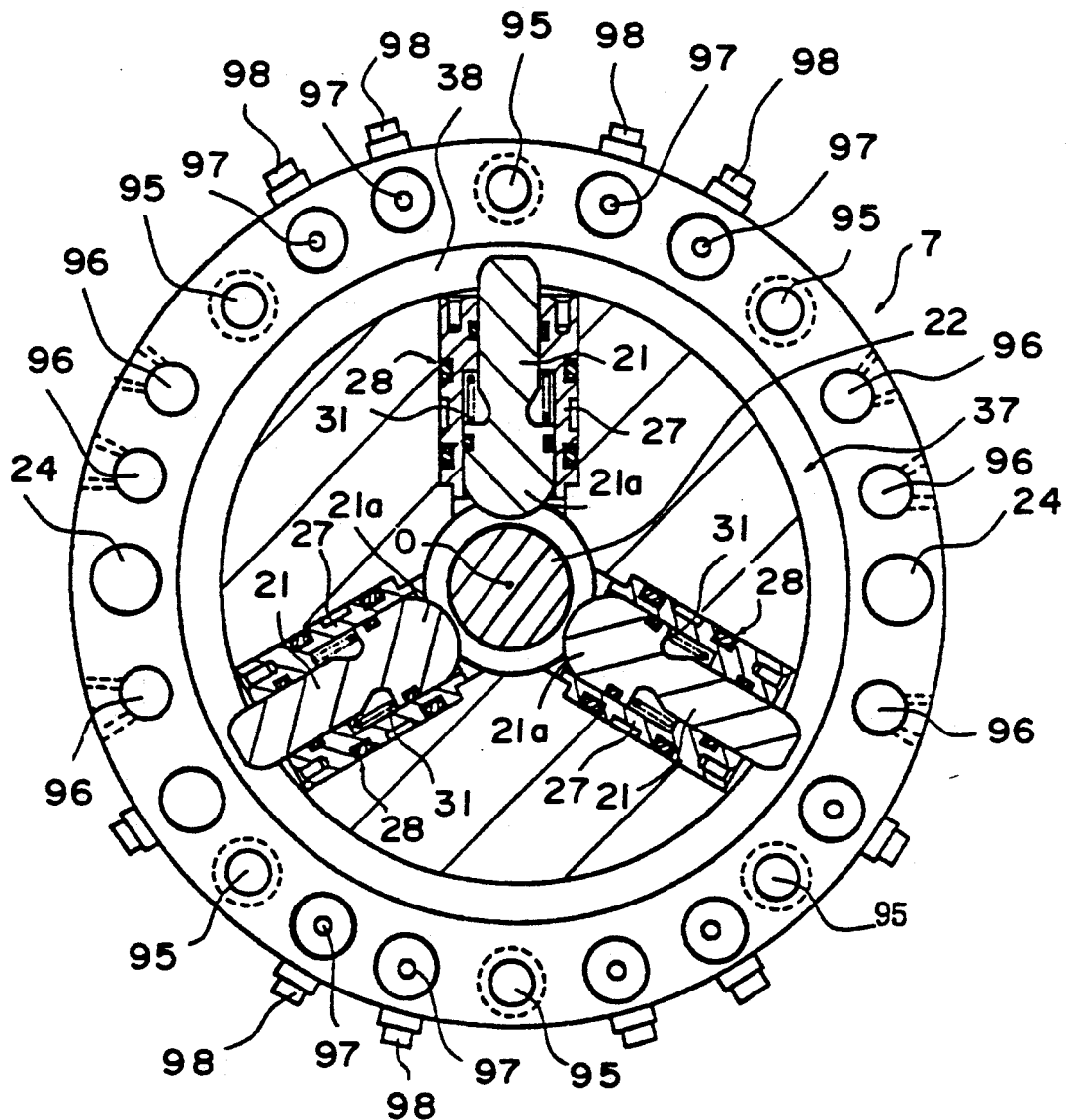
FIG. 4 is a cross-sectional view taken along line IV—IV in FIG. 2.

The locking device 14 extending from the holding member 13 comprises three locking pin assemblies 28, each constructed as a piston-cylinder mechanism with a lock pin 21, having a head 21a, slidably received within a lock cylinder 27. The locking pins are installed so as to move generally radially with respect to the central axis O and are equally spaced around the circumference of the locking device 14, as illustrated in FIG. 4. The lock cylinders 27 are mounted within holes defined by the holding member 13 so as to be fixed relative to the holding member 13.

The lock pins 21 are slidably mounted in the lock cylinders 27 and are resiliently biased toward their retracted positions, as illustrated in FIG. 3, by coil springs 31. In their retracted positions, the radially outermost end portions do not extend beyond the periphery of the locking device 14. In their extended positions, as illustrated in FIG. 2, the radially outermost end portions contact the cam surface 38 so as to urge the first attaching member 6 and the second attaching member 7 towards each other.

Compressed air supplied from a second air supply port 32 formed through a side portion of the cylinder member 12 under the piston 16, is supplied to the radially outermost side of head portion 21a of each lock pin 21 through a second air passage 33 formed by an outer groove 34 on the sleeve member 26.

A separator 36 is formed on the lower central portion of the locking device 14 and comprises a coil spring 35 interposed between the separator 36 and a spring retainer 13e attached to the holding member 13. Separator 36 is slidably attached to the holding member 13 by supporting pins 90 and is biased away from the holding member 13 by the spring 35. Separator 36 smoothly separates the second attaching member 7 from the first attachment member 6 by pushing the mounting plate 39 with the resilient force of the coil spring 35, which is compressed when separator 36 comes into contact with the mounting plate 39. Although mounting plate 39 is illustrated as being formed separately from the second attachment member 7, it is to be understood that it may be integrally formed with the second attachment member 7.

The second attachment member 7 comprises a generally ring-like structure, as illustrated in FIG. 4, has a cam portion 37 projecting radially inward from an upper portion. The second attachment member defines holes 95 for attaching the mounting plate 39 thereto and may define air supply inserting holes 96, as well as electrode contacts 97 and electrode terminals 98.

On a lower side of the radially inwardly extending cam portion 37, cam surface 38 is formed which faces generally away from the peripheral edge portion 7a. The cam surface 38 is oriented such that, when contacted by a portion of the locking pins 21, the mounting surface is urged into contact with the seating surface. By forming the cam surface 38 on a radially inwardly extending cam portion 37, the radial dimension of the peripheral edge portion 7a may be increased to provide a wider sealing surface, to increase the rigidity and to reduce the play of the tool attachment mechanism. Mounting plate 39 is affixed to the second attachment member 7 and may be attached to the tool by any known means. Alternatively, the mounting plate 39 may be formed integrally with the second attachment member 7, or may be eliminated altogether.

When the second attachment member 7 is mounted on the first attachment member 6, the locking device 14 and the cam surface 38 are enclosed in a recessed portion defined by the generally annular second attachment member 7 and the mounting plate 39, which recessed portion is hermetically sealed by the contact between the seating surface and the mounting surface. Thus, even if the industrial robot 1 is used in an environment which includes air-borne contaminants, such as dust, water, and the like, the locking device 14 and the cam surface 38 will remain uncontaminated and will, therefore, work reliably in virtually all working environments.

As noted previously, the increased radial width of the cam portion 37 enables a relatively wide rubber packing 6b to be disposed between the seating surface 6a and the mounting surface 7a thereby improving the dust proof and water proof functions of the attaching device so as to enable the locking mechanism to work reliably and repeatably. It is to be understood, however, the rubber packing 6b may be eliminated if the device is utilized in a clean, contaminant-free environment.

Thus, as can be seen, the tool 4 is held by the tool holding device 3 by connecting the second attachment member 7 to the first attachment member 6, which is attached to the end of the manipulating arm 2 of the industrial robot 1. The attachment member 7 may be provided with holes located so as to be engaged by the radially outermost ends of the locking pins 21 as an alternative.

In order to attach the tool 4 to the end of the manipulating arm 2, the first attachment member 6 is attached to the end of the manipulating arm 2 and the arm is moved to the desired tool 4, which may be located on a tool stand. The first attachment member is brought into proximity with the second attachment member 7 as shown in phantom lines in FIG. 3, and is then lowered until the locking device 14 enters the recessed portion of the second attachment member 7. Compressed air is then supplied to cylinder 17 above the piston 16 through first air supply port 19 so as to urge piston 16 downwardly such that the conical cam 22 is inserted between the radially innermost portions of the lock pins 21. Since the conical cam 22 is capable of lateral movement with respect to the piston 16, it will contact all of the locking pins 21 at substantially the same time so as to urge all of the locking pins 21 radially outwardly towards their extended positions. As the lock pins 21 are extended radially outwardly, their outermost end portions are pushed against the cam surface 38 of the second attachment member 7 thereby urging the second attachment 7 toward the first attachment member 6 such that mounting surface 39a of the second attachment member 7 is pushed against seating surface 13b of the first attachment member and deforming the rubber packing 6b between the seating surface 6a and the mounting surface 7a. Since the second attachment member 7 is sealed against the first attachment member 6 along surfaces which are separate from the locking pins 21 and the cam surface 38, the clearances between these elements does not effect the connection between the first and second attachment members and does not effect the hermetic seal achieved between these members. Thus, despite clearances inherently present in the locking mechanism, the attaching device according to this invention can attach the second attachment member 7 to the first attachment member 6 with an absence of play between these elements, thereby securing attaching the tool 4 to the end of the manipulating arm 2.

Figure 5:
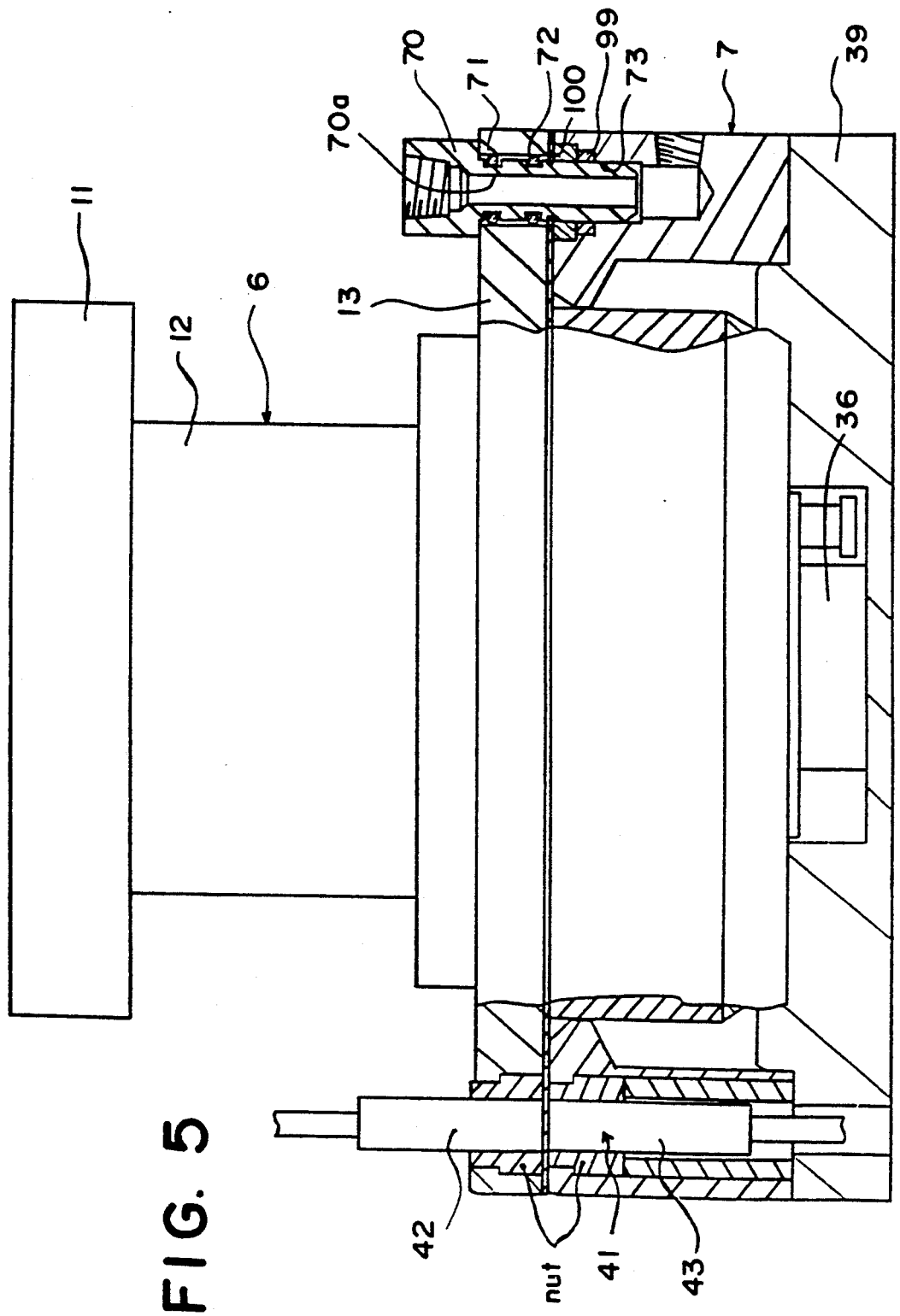
FIG. 5 is a side elevational view, partially in cross section, illustrating the electrical coupler and the air supply system for the attaching device according to the present invention.

In some applications, it is necessary to supply electrical power from the industrial robot 1 to the tool 4. In these instances, electrical coupling means may be provided on the first and second attachment members 6 and 7, as illustrated in FIG. 5. Preferably, the electrical coupling device comprises a known, non-contact type electrical coupler, such as transmitting coupler 41. As is known in the art, such transmitting couplers typically comprise a proximity switch 42, which may be mounted on the first attachment member 6, and a transmission unit 43, which may be mounted on the second attachment member 7. Transmission unit 43, in known fashion, opens and closes the electrical circuit by magnetic resonance when the switch 42 and the transmission unit 43 are disposed in close proximity to each other. With this structure, the mating plane of the seating surface 6a and the mounting surface 7a can be electrically connected without the necessity of pin and socket-type electrical connectors. This facilitates the hermetic sealing of the locking device, while at the same time improving the reliability of the electrical control, since the electrical contacts are not exposed to the contaminated working environment.

An air supply pin 70 is inserted in the holding member 13 of the first attachment member 6 through O-rings 71 and 72 such that the air supply pin 70 may move relative to the holding member 13. The air supply pin 70 defines air passage 70a through its length and is inserted into the hole 73 defined by the second attaching member 7 through a packing 99. The packing 99 is prevented from being pulled out of the second attachment member 7 by snap-ring 100. Air supplied through the air supply pin 70 may be used to power the tool 4.

When the first and second attachment members 6 and 7 are brought into contact with each other, the air supply pin 70 is inserted into the hole 73 such that it may move relative to the holding member 13, thereby ensuring secure insertion into the hole 73. When separating the second attachment member 7 from the first attachment member 6, if compressed air is being supplied through the air passage 70a, the second attachment member 7 is pushed away from the first attachment member 6 by the force of this compressed air, by thereby facilitating the separation of the first and second attachment members.

Although the compressed air is supplied to the tool through a separate air supply pin 70, it is to be understood that a positioning pin 25 may be modified so as to define an air passage and thereby also act as an air supply pin. In this case, the corresponding positioning hole 24 would be closed with an appropriate stopper plug.

In order to disengage the tool from the end of the manipulating arm 2, the manipulating arm 2 is moved close to the tool stand and the supply of compressed air into the supply port 19 is cut off. Compressed air is supplied to the second air supply port 32 into the cylinder 17 beneath the piston 16 such that the piston 16 is thereby urged upwardly. This compressed air also passes through second air passage 33 so as to act on the radially outer surfaces of the locking pin heads 21a so as to urge the locking pins 21 radially inwardly toward their retracted positions. This withdraws the radially outermost ends of the pins 21 from contact with the cam surface 38. Once the piston 16 has reached its first, or withdrawn, position and the locking pins have reached their retracted positions, the separator 36 acted on by spring 35 urges the second attachment member 7 away from the first attachment member 6, thereby releasing the tool from the end of the manipulating arm 2. The manipulating arm 2 may then be positioned so as to engage the next tool 4.

With the attaching device of this invention, the tool 4 can be rapidly attached to or detached from the end of the manipulating arm through a cam surface 38 formed on the second attachment member by supplying compressed air so as to advance or retract the conical cam 22, thus extending or retracting the locking pins 21. The set-up time of the tool exchange process can thus be shortened and the production efficiency of the robot can be vastly improved.

Since a plurality of locking pins 21 are operated by a single conical cam 22, the tool 4 can be securely mounted to the end of the manipulating arm with virtually no play between them.

The largest diameters of positioning pins 25 are slightly less than the diameter of the positioning holes 24 formed on the second attachment member 7 so as to enable the positioning pins 25 to be slidably engaged within the positioning holes 24, but, at the same time, prevent any relative rotation between the first and second attachment members when they are connected. The slight clearance between the outer diameter of the positioning pins 25 and the inner diameter of the positioning holes 24 could render it difficult to engage the first and second attachment members under working conditions, particularly when the robot is used in high-temperature work sites which causes thermal expansion of the elements of the attaching device.

Figure 8:
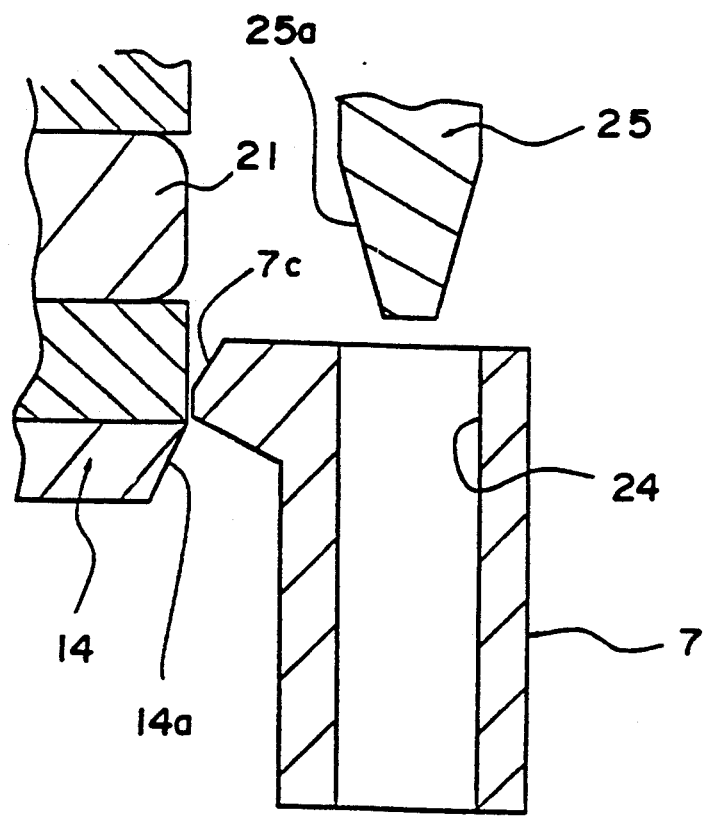
FIG. 8 is a partial, cross-sectional view illustrating the initial engagement between the first and second attachment members.

To alleviate this potential problem, the present invention provides means for substantially aligning the first and second attachment members before the positioning pins 25 enter the positioning holes 24. AS best seen in FIGS. 2 and 8, the outer diameter D of the locking portion 14 is slightly less than the smallest inner diameter d of the second attachment member 7 which defines the boundaries of the recessed portion of the second attachment member. As best seen in FIG. 8, a slight gap is formed between the locking portion 14 and the radially innermost portion of the second attachment member 7. The lower, distal end of the locking portion 14 may have a tapered surface 14a formed thereon, while the upper surface or the second attachment member 7 may define a tapered surface 7c. A tapered surface 25a is formed on the distal end of the positioning pins 25. Thus, the entry of the locking portion 14 into the second attachment member 7, coupled with the tapered surface 25a, prevents the greatest diameter portion of the positioning pins 25 from coming into contact with the inner surfaces of the positioning holes 24 until the first and second attachment members 6 and 7 are substantially aligned with each other. As the positioning pins 25 slide further into the positioning holes 24, the first and second attachment members are precisely positioned relative to each other. The attachment of the first and second attachment members is also rendered easier by forming both the locking portion 14 and the recessed portion of the second attachment member with generally circular cross sections such that small angular displacements between the first and second attachment members do not prevent their assembly. The use of tapered surfaces 14a and 7c facilitates the insertion of the locking device 14 into the recessed portion of the second attachment member, while at the same time minimizing the difference between the outer diameter of the locking portion 14 and the innermost diameter of the second attachment member 7.

The tools 4 are typically placed on a tool stand and may undergo slight horizontal movement. Thus, if the positioning pins 25 are displaced relative to the positioning holes 24 of the second attachment member, the horizontal position of the second attachment member may be adjusted on the tool stand.

In the described embodiment, cam portion 37 has been described as being generally annular in configuration and extending continuously about the inner periphery of the second attachment member 7. It is to be understood that this cam portion 37 may be formed as a plurality of segments displaced around the periphery of the second attachment member 7. Additionally, the coil springs 31, biasing the lock pins 21 toward retracted positions, may also be omitted. The number of lock pins 21 may also vary, depending upon the particular application of the attaching device.

Figure 6:
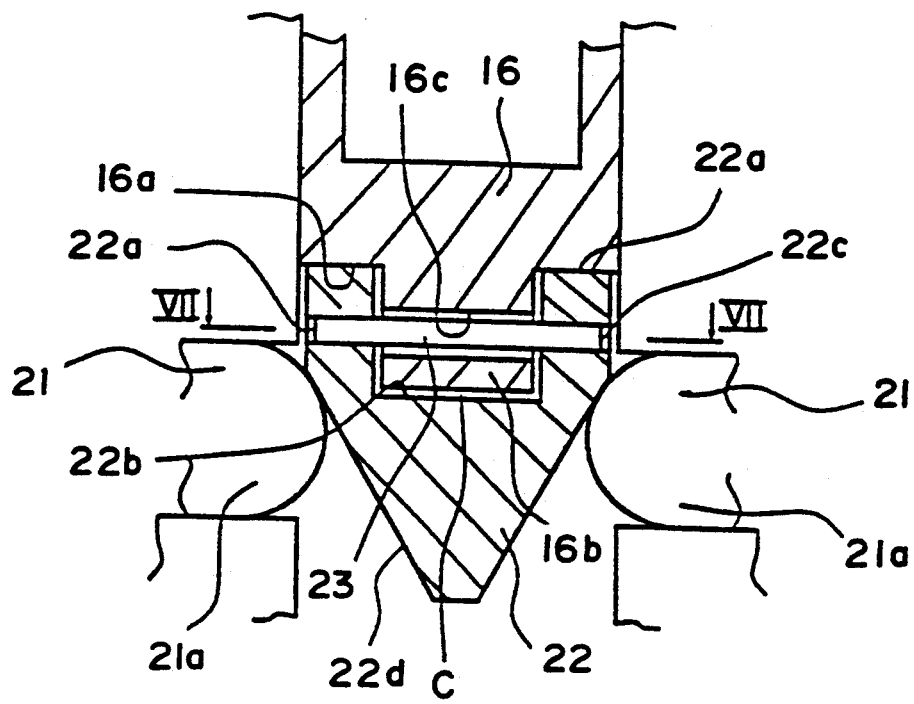
FIG. 6 is a partial, cross-sectional view taken along line VI—VI in FIG. 2.
Figure 7:
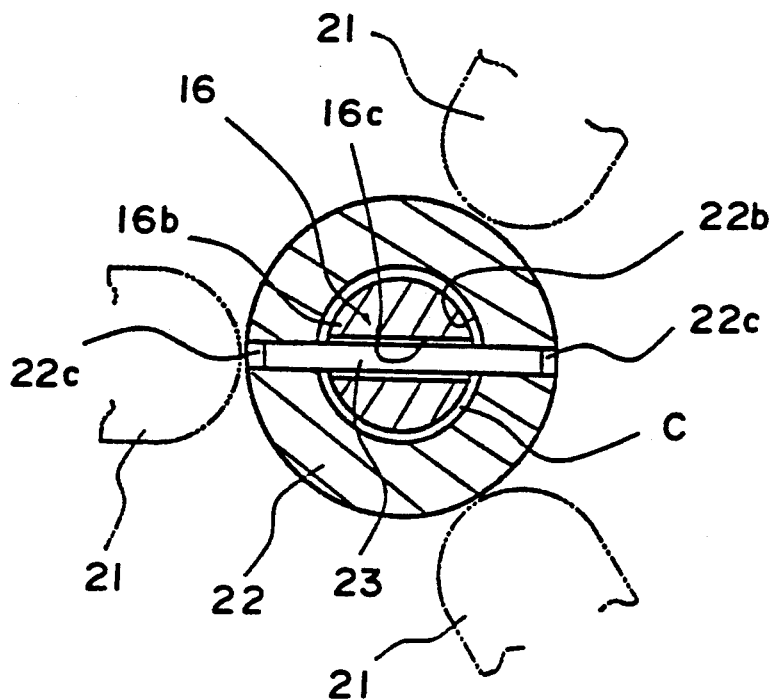
FIG. 7 is a cross-sectional view taken along line VII—VII in FIG. 6.

The connection between the cam 22 and the piston 16 is illustrated in detail in FIGS. 6 and 7. This connection allows relative lateral movement between the cam and the piston to ensure that the cam 22 contacts all of the lock pins 21 substantially simultaneously such that all of the locking pins are moved to their extended positions so as to ensure complete coupling of the first and second attachment members. A projection 16b extends from an end surface of piston 16 and enters a recess 22b defined by the cam member 22. Projection 16b is concentric with the generally annular lower end surface 16a of the piston 16. Similarly, upper end surface 22a is generally annular in configuration and is concentric about the cavity 22b.

The diameter of the projection 16b is smaller than the diameter of the recess 22b so as to define a clearance C between them. Also, the depth of the recess 22b is somewhat larger than the length of the projection 16b so as to define clearance C between them in a longitudinal direction.

A resilient, spring pin 23 extends through the cam member 22 and the projection 16b. Hole 16c, extending laterally through the projection 16b has a diameter somewhat larger than that of the resilient spring pin 23.

Thus, as can be seen, positive downward movement of cam member 22 is assured by the contact between surfaces 22a and 16a as the piston 16 moves downwardly. This ensures that a force is exerted on the locking pins 21 to urge them to their extended positions. Lateral movement of the cam member 22 is permitted by clearance C and the resiliency of the spring pin 23. Thus, if, due to manufacturing tolerances, the cam 22 does not initially contact all of the locking pins 21, it may undergo lateral movement through contact with some of the locking pins 21 which will urge it into contact with the remaining locking pins. Thus, all of the locking pins 21 are extended substantially simultaneously.

Figure 9:
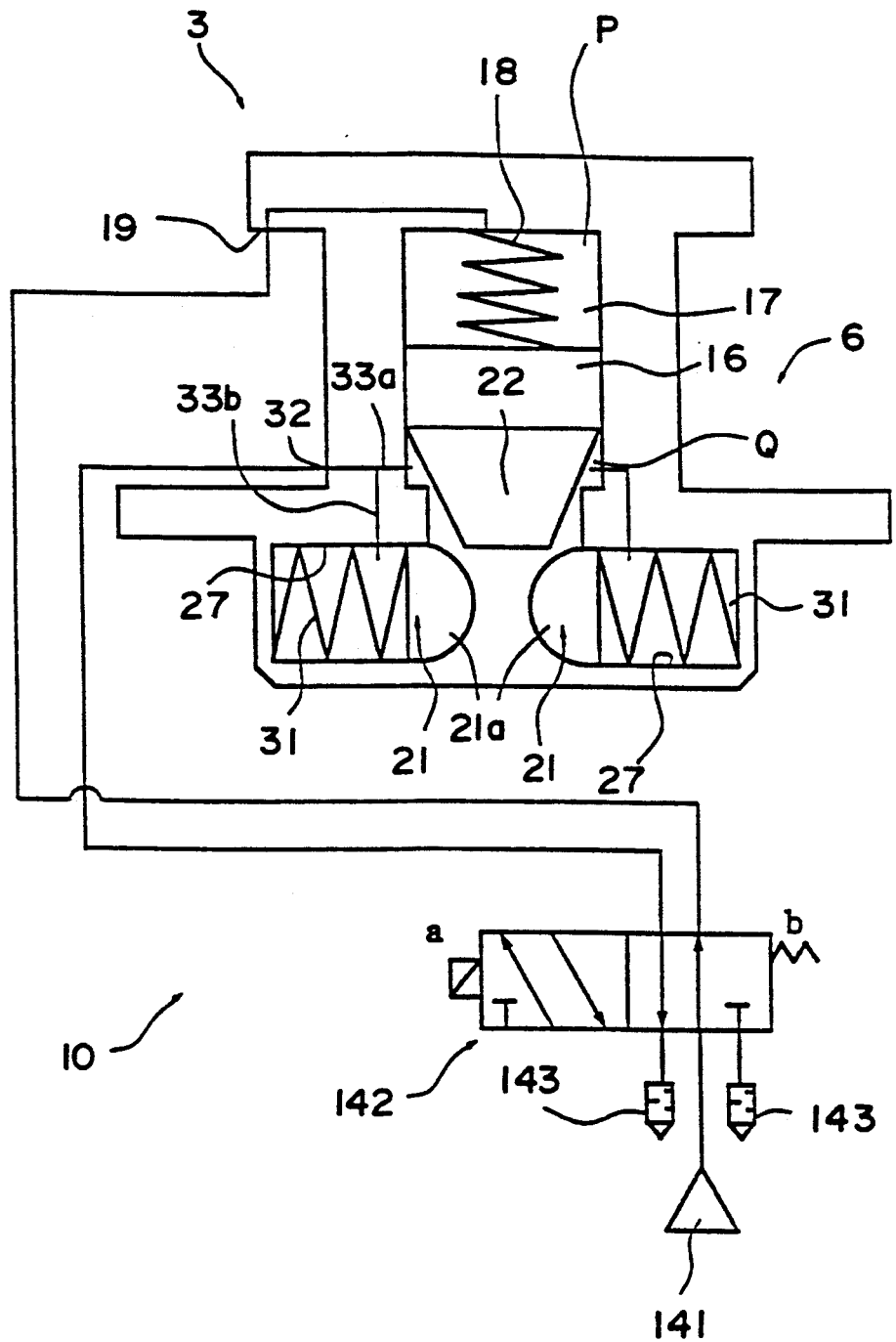
FIG. 9 is a schematic diagram illustrating the pressurized fluid control system according to the present invention.

A pneumatic control circuit 10 for controlling the operation of the attaching device according to this invention is illustrated in FIG. 9. As can be seen, the piston 16 divides the cylinder 17 into a first cylinder chamber P and a second cylinder chamber Q with the first air passage 15 communicating with chamber P. Spring 18 urges the piston 16 downwardly and, consequently, the locking pins 21 to their extended, locking positions, in order to keep the first and second attachment members together even if the pneumatic pressure should be unexpectedly reduced or terminated altogether. However, it is possible to eliminate the spring 18 and rely solely on pneumatic pressure to actuate the mechanism. Also, although compressed air is described as the actuating medium, it is to be understood that the attaching device may be actuated by a hydraulic actuating system with oil substituted for the compressed air. As another alternative, it is possible to exert the downward and locking force on the piston 16 solely by the spring 18 without the need to resort to a pressurized fluid acting in first cylinder chamber P.

The circuit 10, as illustrated in FIG. 9, has air passages 33a, communicating with second cylinder chamber Q and air passage 33b for communicating with one side of the locking pins 21 so as to retract the piston 16, as well as each of the locking pins 21.

Electromagnetic valve 142 is operatively interposed between a source of pressurized air 141 and conduits connected to first air inlet port 19 and second air inlet port 32. Electromagnetic valve 142 is shifted between its two positions by solenoid a. The solenoid valve is moved toward the right when solenoid a is energized and is moved toward the left, as viewed in FIG. 9, by a spring b when the solenoid a is deenergized. When in the left-most position, the source of pressurized air 141 supplies pressurized air to the first inlet port 19 so as to urge the piston 16 downwardly and the locking pins 21 toward their extended positions. Second port 32 is connected to a reservoir or accumulator 143. If compressed air is utilized, this port may be vented to atmosphere with element 143 being a sound deadener to minimize the sound of the escaping compressed air.

When it is desired to detach the second attachment member 7 from the first attachment member 6, valve 142 is moved toward its right-most position which connects the source of pressurized air 141 to the second inlet port 32 and vents the first inlet port 19 to atmosphere. In this position, pressurized air will enter the second cylinder chamber Q through passage 33a and will act to retract the locking pins 21 through air passage 33b. By acting on the head portion 21a of each lock pin 21, the pressurized air ensures that each of the lock pins 21 is retracted and is assisted in this retraction by the force of coil spring 31. This ensures that the locking pins 21 are withdrawn from engagement with the cam surface 38 such that the separation of the second attachment member 7 from the first attachment member 6 will be reliable.

By spring biasing the valve 142 towards its left-most position in FIG. 9 so as to supply pressurized fluid to the first cylinder chamber P which thereby urges the locking pins 21 to their extended positions, the inadvertent detachment of the first and second attachment members is prevented even if the solenoid a, or the source of compressed air 141 are unexpectedly deenergized.

Figure 10:
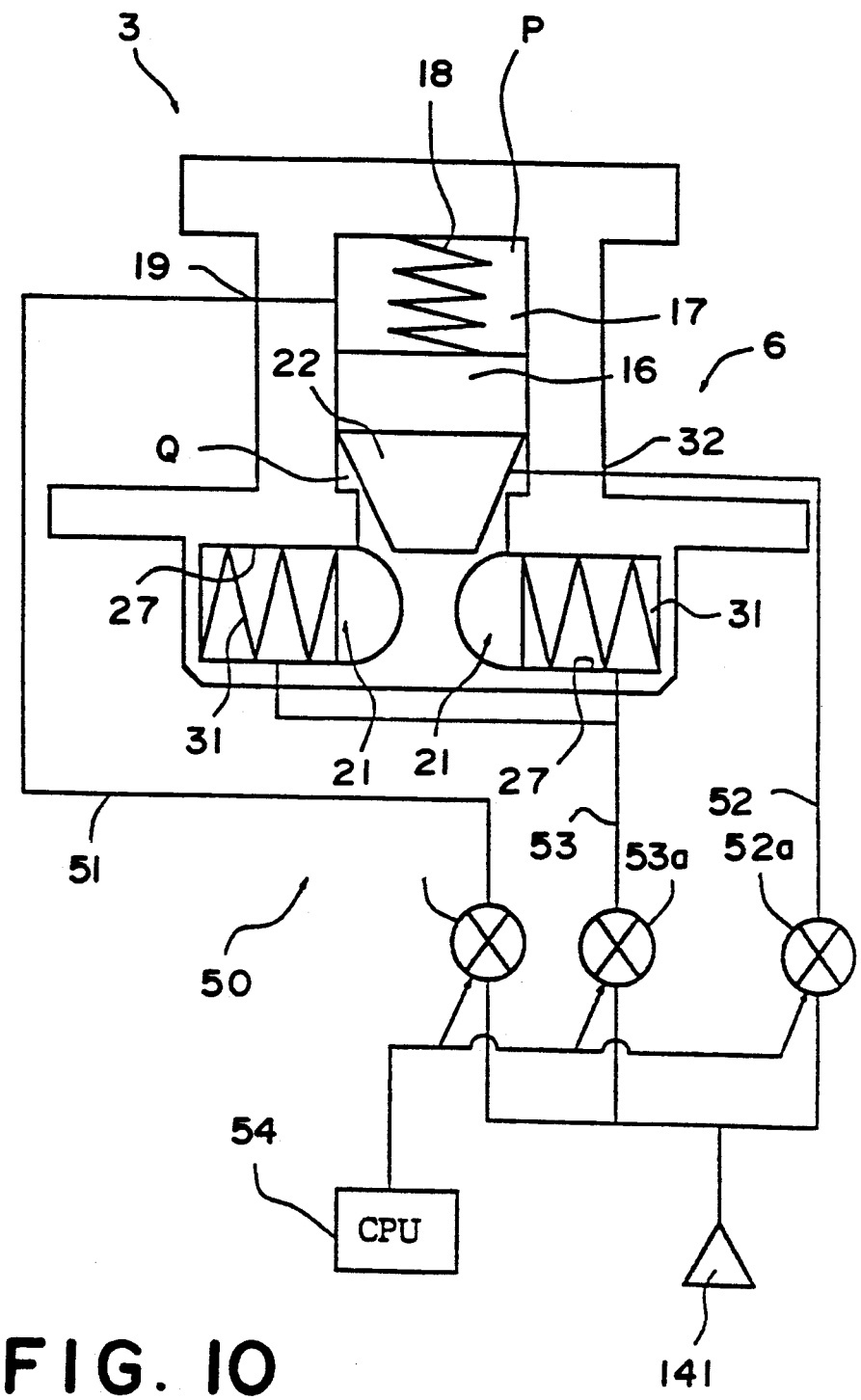
FIG. 10 is a schematic diagram showing a second embodiment of the pressurized fluid control system according to the present invention.

An alternative embodiment for the control circuit is illustrated in FIG. 10. In this embodiment, the single valve 142 has been replaced by three separate valves 51a, 53a and 52a which selectively control the supply of compressed air to the first inlet port 19 (valve 51a), the second inlet port 32 (valve 52a) and a third conduit 53 which connects the source of pressurized air 141 to the locking pins 21. The valves 51a, 52a and 53a are electrically controlled and may be connected to and controlled by microcomputer 54.

Since conduits 51, 52 and 53 are connected to a common source of compressed air 141, the cross-sectional area of conduit 51 is larger than those of conduits 52 and 53 in order to supply the requisite amount of compressed air to the first cylinder chamber P in order to operate the piston 16 and cam 22 rapidly. It is also possible to make the conduits 51, 52 and 53 dependent of one another by connecting them to separate sources of compressed air to supply the appropriate amount of compressed air necessary for the required actions.

When attaching the first and second attachment members, microcomputer 54 opens valve 51a and closes valves 52a and 53a. When detaching the first and second attachment members, the microcomputer 54 controls the valves such that valve 51a may be closed, while valves 52a and 53a may be opened. Although generally, valves 52a and 53a are opened or closed simultaneously, some operations may necessitate a slight time lag between the operations of these two valves.

Although springs 31 have been described as assisting in the retraction of the locking pins 21, these may be eliminated and the compressed air may be relied upon to retract the locking pins 21.

Figure 11:
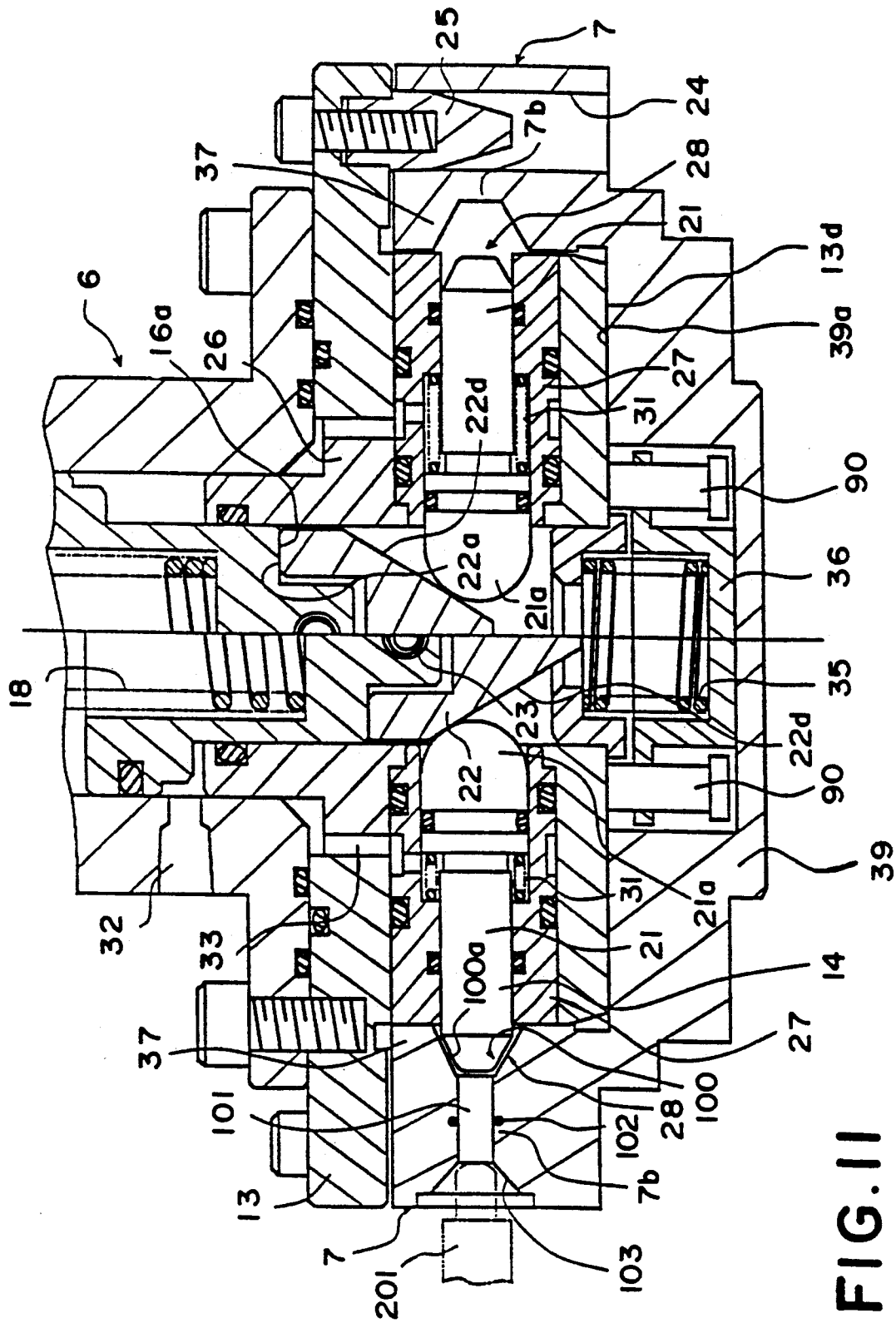
FIG. 11 is a cross-sectional view illustrating a second embodiment of the attaching device according to the present invention.
Figure 12:
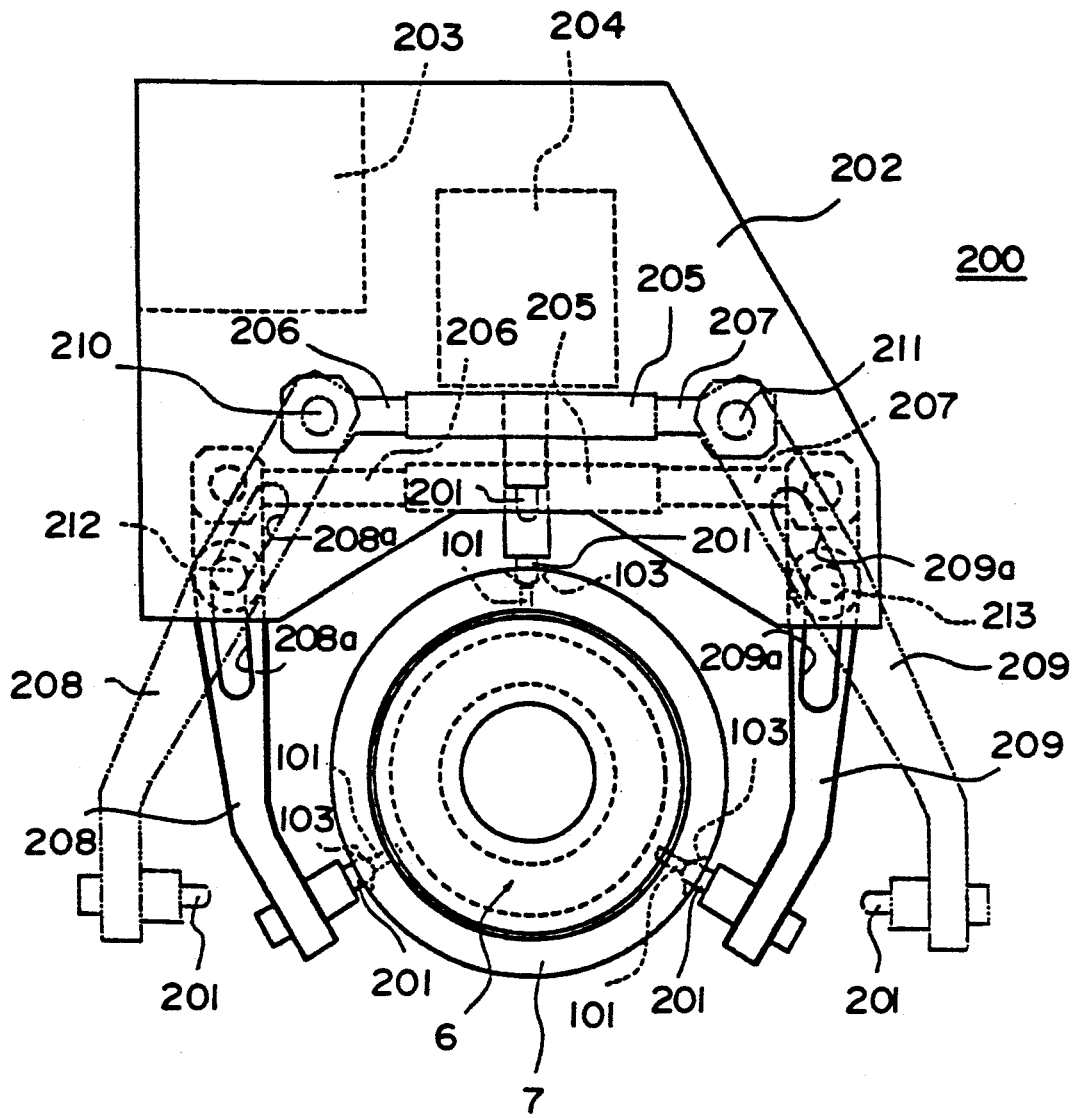
FIG. 12 is a top view of a tool stand for the embodiment described in FIG. 11.

A second embodiment of the attaching device according to this invention is illustrated in FIGS. 11 and 12. In these figures, elements having the same or equivalent functions as those in the previously described embodiment have been assigned these same identifying numerals. In this embodiment, the second attachment member 7 on its radially inner facing surface defines lock holes 100 which are adapted to be engaged by the radially outermost portion of the lock pins 21. Each of the lock holes 100 has a tapered surface 100a such that insertion of the locking pins 21 therein hermetically seals seating surface 13d of the first attachment member 6 against the mounting surface 39a of the mounting plate 39. A pin 101 is slidably provided in lock holes 100 generally aligned with the central axis of the hole 100 and having an outer end which communicates with an unlocking hole 103 provided in a radially outer surface of the second attachment member 7. An O-ring 102 extends around the pin 101.

In order to detach the second attachment member 7 from the first attachment member 6, a support pin 201 provided on tool stand 200, illustrated in FIG. 12, enters the unlocking hole 103 and pushes against pin 101 so as to slide the pin 101 radially inwardly. Locking pins 21 can be moved toward the center axis O by the compressed air entering lock cylinder 27 without being fixed in the lock hole 100.

Tool stand 200 comprises a receptacle plate 202 supported by a prop 203 and a cylinder 204 is installed on the lower side of the receptacle plate. A support arm 205 is advanced or retracted by cylinder 204. Rods 206 and 207 are extendably and contractibly provided on both sides of support arm 205 and are connected to support arms 208 and 209 which may pivot about support pins 210 and 211. Support arms 208 and 209 define guide grooves 208a and 209a and are supported on the receptacle plate 202 by guide pins 212 and 213 inserted into the guide grooves 208a and 209a. Support pins 201 are mounted on the distal ends of support arms 208 and 209, respectively, and a third support pin 201 is provided at a generally central location of the support arm 205.

In order to detach the second attachment member from the first attachment member, the manipulating arm 2 of the robot is positioned such that the second attachment member 7 is located between the three support pins 201 of the tool stand 200. In this position, the cylinder 204 of the tool stand 200 is actuated so as to advance the support arm 205 toward the second attachment member 7. By this operation, the left and right support arms 208 and 209 are pivoted about their guide pins 212 and 213 thereby inserting the support pins 201 on their distal ends into unlocking holes 103 of the second attachment member 7. The support pin 201 on the support arm 205 is also inserted into an unlocking hole 103 on the second attachment member 7. Since the support pins 201 push pins 101 the locked pins 21 can be moved toward their retracted positions by compressed air supplied into the lock cylinder 27. By withdrawing the locking pins 21 from the lock holes 100, pins 101 may slide radially inwardly enabling the support pins 201 to enter the locking holes 100 such that the second attachment member 7 may be attached to the tool stand 200.

The foregoing description is provided for illustrative purposes only and should not be construed as in any way limiting this invention, the scope of which is defined solely by the appended claims.

I claim:

1. An attaching device for attaching a tool to a tool manipulating arm comprising:
   a) a first attachment member adapted to be affixed to one of the tool and the tool manipulating arm and defining a seating surface;
   b) locking means located on the first attachment member
   c) a second attachment member adapted to be affixed to the other of the tool and the tool manipulating arm, the second attachment member defining: a recessed portion adapted to receive the locking means therein; a mounting surface; and a cam surface adapted to contact the locking means so as to urge the seating surface and mounting surface into sealing contact so as to hermetically seal the locking means in the recessed portion;
   d) non-contact type electrical coupler means operatively associated with the first and second attachment members, the non-contact electrical coupler means comprising a first unit located on the first attachment member adjacent to the seating surface and a second unit located on the second attachment member adjacent to the mounting surface such that the first and second units are adjacent to each other when the first and second attachment members are locked together; and,
   e) positioning means operatively associated with the attachment members comprising: a positioning pin located on one of the first and second attachment members; and, a positioning hole defined by the other of the first and second attachment members adapted to receive therein the positioning pin.

2. The attaching device of claim 1 wherein the first attachment member comprises:
   a) a cylinder member portion defining a cylinder having a central axis therein; and
   b) a holding member portion associated with the cylinder member.

3. The attaching device of claim 2 wherein the locking means comprises:
   a) a plurality of elongated locking pins movable between extended and retracted positions;
   b) a piston slidably located in the cylinder and movable between first and second positions; and,
   c) a cam member attached to the piston so as to move therewith, the cam member engaging the plurality of locking pins such that when the piston moves from its first position to its second position, the plurality of locking pins are moved to their extended positions.

4. The attaching device of claim 3 wherein the cam member defines a generally conical cam surface adapted to engage the plurality of locking pins.

5. The attaching device of claim 3 wherein the piston moves along the central axis of the cylinder and further comprising means to attach the cam member to the piston so as to allow movement of the cam member relative to the piston in directions defining a plane extending generally perpendicular to the central axis.

6. The attaching device of claim 5 wherein the means attaching the cam member to the piston comprises:
   a) a recess defined by the cam member;
   b) a protrusion extending from the piston and located so as to enter the recess, the dimensions of the protrusion measured in directions generally perpendicular to the central axis being less then similar dimensions of the recess so as to provide a clearance therebetween; and,
   c) a resilient pin extending through the cam member and the protrusion.

7. The attaching device of claim 3 further comprising biasing means to bias the piston toward the second position.

8. The attaching device of claim 7 wherein the biasing means comprises a spring located in the cylinder.

9. The attaching device of claim 3 further comprising fluid actuated means acting on the piston so as to move the piston between its first and second positions.

10. The attaching device of claim 9 wherein the fluid actuated means comprises:
    a) a source of pressurized fluid,
    b) first conduit means communicating with one side of the piston;

c) second conduit means communicating with an opposite side of the piston; and, d) valve means operatively interposed between the source of pressurized fluid, and the first and second conduits so as to control the flow of pressurized fluid passing through the first and second conduits.

11. The attaching device of claim 10 further comprising third conduit means operatively associated with the plurality of locking pins such that pressurized fluid passing through the third conduit means causes the plurality of locking pins to move towards their retracted positions.

12. The attaching device of claim 11 wherein the third conduit means communicates with the cylinder.

13. The attaching device of claim 11 wherein the third conduit means communicates with the source of pressurized fluid and further comprising valve means operatively associated with the third conduit means so as to control the flow of pressurized fluid therethrough.

14. The attaching device of claim 1 wherein the second attachment member comprises:
a) a mounting plate; and,
b) a cam ring located on the mounting plate, the cam ring defining the mounting surface and the cam surface.

15. The attaching device of claim 14 wherein the cam surface and mounting surface face in generally opposite directions.

16. The attaching device of claim 14 wherein the cam ring is generally annular in configuration and extends from the mounting plate so as to define the recessed portion in the second attachment member.

17. The attaching device of claim 16 wherein the recessed portion has a minimum lateral dimension d and further comprising a locking portion containing the locking means extending from the first attachment member located so as to enter the recessed portion, the locking portion having a lateral dimension D such that D is less than d.

18. The attaching device of claim 1 wherein the positioning pin has a generally truncated conical portion.

19. An attaching device for attaching a tool to a tool manipulating arm, comprising:
a) a first attachment member adapted to be affixed to one of the tool and the tool manipulating arm and defining a seating surface;
b) a second attachment member adapted to be affixed to the other of the tool and tool manipulating arm, the second attachment member defining a mounting surface and a cam surface; and,
c) locking means operatively associated with the first attachment member and engageable with the cam surface so as to urge the seating and mounting surfaces into sealing contact with each other, the locking means comprising:
 i) a plurality of locking pins movable between extended and retracted positions;
 ii) a piston movable along an axis between first and second positions;
 iii) a cam member attached to the piston so as to move therewith, the cam member engaging the plurality of locking pins such that when the piston moves from its first position to its second position, the plurality of locking pins are moved to their extended positions; and,
 iv) means to attach the cam member to the piston so as to allow movement of the cam member relative to the piston in directions defining a plane extending generally perpendicular to the axis.

20. The attaching device of claim 19 wherein the cam member defines a generally conical cam surface.

21. The attaching device of claim 19 wherein the means attaching the cam member to the piston comprises:
a) a recess defined by the cam member;
b) a protrusion extending from the piston and located so as to enter the recess, the dimensions of the protrusion measured in directions generally perpendicular to the central axis being less then similar dimensions of the recess; so as to provide a clearance therebetween and,
c) a resilient pin extending through the cam member and the protrusion.

* * * * *